Feb. 9, 1971        D. E. FRITZSCHE        3,561,020
WORK SURFACE CLAMPING MEANS FOR
DROP-IN COOKING EQUIPMENT
Filed June 24, 1969

INVENTOR
DONALD E. FRITZSCHE

BY Arthur E. Fournier Jr.

ATTORNEY

United States Patent Office 3,561,020
Patented Feb. 9, 1971

3,561,020
WORK SURFACE CLAMPING MEANS FOR DROP-IN COOKING EQUIPMENT
Donald E. Fritzsche, Chicago Heights, Ill., assignor to General Electric Company, a corporation of New York
Filed June 24, 1969, Ser. No. 836,038
Int. Cl. E03c 1/33; F24c 15/10
U.S. Cl. 4—187                                           6 Claims

ABSTRACT OF THE DISCLOSURE

Clamping means for fastening a drop-in cooking equipment device to a work surface including a stiffening angle suitably secured to the under side of the work surface adjacent to an opening provided therein for receiving the drop-in device, one leg of the stiffening angle having at least one slot therein for receiving an end of at least one clamping member, the other end of the clamping member engaging an externally projecting flange of the drop-in device, and a screw suitably received by the portion of the clamping member extending between the end thereof passing through the slot in the stiffening angle and the end of the clamping member engaging the externally projecting drop-in device flange whereby rotation of the screw in a given direction causes the clamping member to move away from the work surface such that the trim surrounding and integral with the perimeter of the drop-in device is drawn down tightly upon the upper side of the work surface adjacent the opening therein.

BACKGROUND OF THE INVENTION

(1) Field of the invention

My invention relates to clamping means, and more particularly to an improvement in pull-down clamps utilized for purposes of fastening a drop-in cooking equipment device to the work surface upon which the drop-in device is to be supported.

(2) Description of the prior art

Although a number of different types of clamping means have been known for use in fastening a so-called "drop-in" cooking equipment device such as a griddle, hotplate, etc., to the work surface upon which the drop-in device is intended to be supported, none of these prior art clamping means has proven entirely satisfactory to use.

For example, one of the more common methods of fastening drop-in devices to a work surface is by spot welding an angle along the periphery of the opening in the work surface suitably provided therein for the drop-in device and then drilling holes through the work surface and the angle to accept studs that are welded to the top trim of the drop-in device. Conventional securing means may then be utilized in conjunction with the studs for purposes of retaining the drop-in device in place. One obvious disadvantage of this particular method stems from the need to drill such holes in a prescribed pattern so that they will be properly located for purposes of receiving the studs carried by the aforementioned trim of the drop-in device. This makes the task of the installer considerably more difficult particularly if such holes and the studs are found to be slightly out of alignment. Further, it may unnecessarily restrict the user's flexibility with regard to meeting future equipment needs through the interchange of one particular type and/or size of drop-in cooking equipment device for another inasmuch as the relationship between the previously drilled holes in the work surface may not exactly match that of the studs carried by the new piece of equipment.

Another method which has been employed by the prior art primarily in an attempt to avoid the use of studs and the customary accompanying need to drill holes in the work surface has involved the use of a hinged clip that is drawn into place by a screw. In practice, one leg of the aforesaid clip is supported in juxtaposed relation to the inside surface of the side wall of the drop-in device while the hinged leg, i.e., the other leg of the clip, is intended to engage the underside of the work surface. By rotating the aforementioned screw which passes through the side wall of the drop-in device as well as through at least the hinged leg of the clip, the hinged leg is made to pivot against the underside of the work surface with the result that the work surface is captured between the trim of the drop-in device which engages the upper side of the work surface and the hinged leg of the clip which engages the under side of the work surface. Although this latter method of fastening a drop-in device to a work surface utilizes a clamping means which overcomes the disadvantages relating to the use of studs and the need for drilling holes in the work surface, the hinged clip and its accompanying manner of employment is not generally speaking as economically feasible as the former method. That is, the hinged clip constitutes a more complex clamping member as viewed both from the standpoint of its actual manufacture as well as from the standpoint of determining what design characteristics it should have with regard to the resiliency of the hinged leg, etc. Further, there exists the possibility that the hinged leg of the clip may engage the edge of the work surface as the drop-in device is being lowered into the opening provided therefor in the work surface such that the clip becomes unusable by virtue of the hinged leg thereof having been deformed and/or broken.

OBJECTS OF THE INVENTION

It is therefore an object of the present invention to provide a novel and improved clamping means for fastening a drop-in device to a work surface which will obviate the installation problems associated with prior art clamping means used by industry today.

It is another object of the present invention to provide such a clamping means which will eliminate the requirement to drill holes in the work surface for purposes of fastening the drop-in device in the opening provided therefore in the work surface while yet retaining the capability of ensuring that the drop-in device is properly aligned with respect to the edge portions of the aforesaid work surface opening.

A still further object of the present invention is to provide such a clamping means which simplifies the task of fastening the drop-in device to the work surface, requires minimum manual effort, and yet enables a secure connection to be made therebetween.

Yet another object of the present invention is to provide such a clamping means which includes a minimum number of component parts, all of which are relatively simple and inexpensive to manufacture.

SUMMARY OF THE INVENTION

In accordance with a preferred form of the present invention there is provided a clamping means for fastening a drop-in device such as drop-in cooking equipment to a work surface upon which the device is to be supported. The subject clamping means includes a stiffening angle which is suitably secured to the under side of the work surface adjacent to an opening provided therein for receiving the drop-in device. A leg of the stiffening angle, which is generally perpendicular to the work surface includes preferably a plurality of slots each of which is capable of receiving one end of a corresponding clamping member. The other ends of the clamping members rest upon the top of a horizontal flange which extends outwardly adjacent the bottom of the drop-in device. The portion of each of the clamping members between the end carried by the slot and the end resting on the aforesaid flange threadably receives a screw, the end of which bears against the leg of the stiffening angle which is in juxtaposed relation to the work surface. Clockwise rotation of each of these screws thus causes the associated clamping member to move away from the work surface and, because the clamping member bears against the upper surface of the aforesaid flange at the bottom of the drop-in device, results in the horizontal flange of the trim surrounding and integral with the perimeter of the drop-in device being drawn down tightly upon the upper side of the work surface.

The invention will be more fully understood from the following detailed description and its scope will be pointed out in the appended claims.

DESCRIPTION OF A PREFERRED EMBODIMENT

Figure 1:
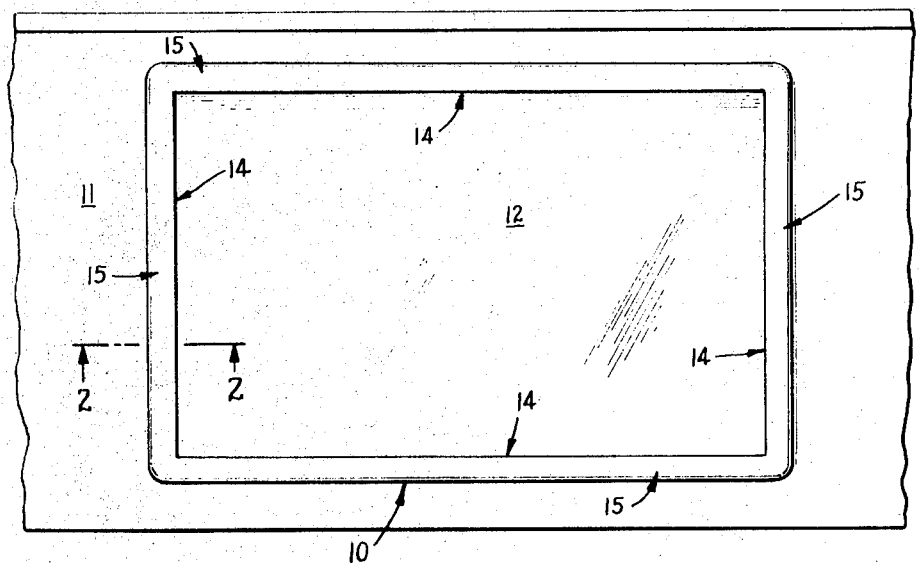
FIG. 1 is a plan view of a drop-in cooking equipment device positioned in an opening provided therefor in a suitable work surface and fastened in place by means of clamping means in accordance with the present invention.

Referring now to FIG. 1 of the drawing, the invention is shown as incorporated in a drop-in cooking equipment device such as a griddle, generally designated by reference numeral 10, which is illustrated as being supported in an opening provided therefor in a work surface 11. The griddle 10 is provided with a suitable cooking surface 12 heated by conventional means (not shown) in the manner well-known to those skilled in the art. In addition, the griddle 10 includes a bottom wall 13, and a plurality of vertically extending side walls 14 which surround the periphery of the cooking surface 12 in conventional fashion. The horizontal flange 15a of the trim 15 which projects outwardly from the uppermost edges of the vertically extending side walls 14 surrounds and is integral with the perimeter of the drop-in device, i.e., griddle 10. The other structural details of the griddle 10 have not been specifically illustrated in the drawing inasmuch as the general construction and manner of operation of drop-in devices such as the griddle 10 are well-known to those skilled in the art and inasmuch as these other structural details of the griddle 10 form no part of the present invention.

Figure 2:
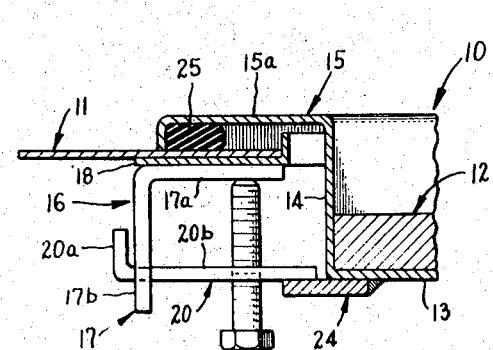
FIG. 2 is a cross-sectional view of a portion of the drop-in device and work surface of FIG. 1 taken substantially on the line of section 2—2 of FIG. 1 and illustrating a clamping means in accordance with the present invention.
Figure 3:
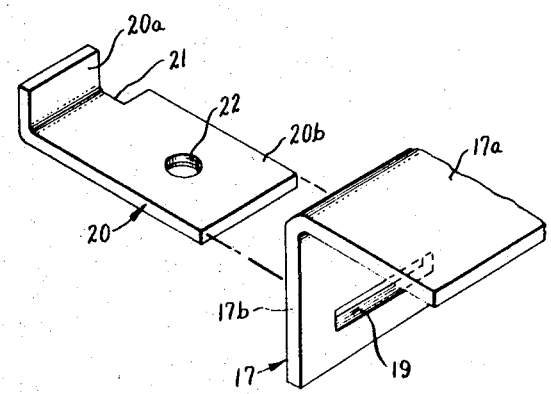
FIG. 3 is an exploded perspective view of a portion of a clamping means in accordance with the present invention.

With reference now more particularly to FIGS. 2 and 3 of the drawing, the pull-down clamping means 16 illustrated therein includes a right-angle stiffening angle 17 having one leg 17a thereof spot-welded to the under side of member 18, and having the other leg 17b thereof extending downwardly at right angles to the aforementioned under side of member 18. In accordance with the preferred practice, member 18 is affixed in any suitable manner such as by spot welding to the upper side of leg 17a of right-angle stiffening angle 17. This is customarily accomplished at the time of manufacture such that the assembly comprising stiffening angle 17 and member 18 is therefore in condition for installment at the place of employment without requiring any further attachment to be made therebetween. One function of member 18 is to act as a form of dam to ensure that grease, etc., is prevented from running into the work surface opening should such material in some manner flow pass gasket 25. It is of course to be understood that leg 17a of stiffening angle 17 could be spot welded directly to the under side of work surface 11 rather than to member 18 without departing from the essence of the present invention if one desired to eliminate the use of member 18. Leg 17b of stiffening angle 17 is provided with a plurality of openings 19 suitably located at spaced intervals, only one such opening 19 having been illustrated in the drawing in the interest of simplicity of illustration and description. Each of the openings 19 is substantially identical in dimensions to the one such opening 19 shown in FIG. 3 of the drawing.

Clamping means 16 further includes a substantially L-shaped clamping member 20 having an upstanding leg 20a of a relatively short length as compared to the length of the other leg 20b of clamping member 20. The legs 20a and 20b of clamping member 20 extend substantially at right angles to each other and a notch 21 is provided in leg 20b at the juncture of legs 20a and 20b for a purpose to be more fully described hereinafter. Additionally, clamping member 20 includes a threaded hole 22 suitably located in leg 20b intermediate the two ends thereof. The width of leg 20b of clamping member 20 is made such that the leg 20b will be capable of passing through one of the openings 19 provided in leg 17b of stiffening angle 17.

As seen in FIG. 2 of the drawing, a screw 23 is threadably received in the threaded hole 22 provided in leg 20b of clamping member 20. It will also be seen that in a manner to be more fully described hereinafter, the free end of leg 20b of clamping member 20 frictionally engages the upper surface of outwardly projecting flange member 24, the latter being suitably affixed such as by welding to the under side of bottom wall 13 of the drop-in device, i.e., griddle 10.

In accordance with the preferred embodiment of the invention, a plurality of such clamping means 16 are utilized to fasten any given drop-in device to a particular work surface. Of course, the exact number of clamping means 16 utilized in any specific installation varies in accordance with what is necessary to establish and maintain a secure connection between the work surface and the supported drop-in device. Experience has shown that it is generally desirable to provide a stiffening angle 17 in juxtaposed relation to the under side of work surface 11 adjacent the entire perimeter of the opening provided therein to receive the particular drop-in device. That is, a stiffening angle 17 will preferably be utilized along each of the four sides of the work surface opening. Furthermore, the four stiffening angles 17 so provided normally vary in length in accordance with the dimensions of the work surface opening, and also may vary correspondingly as to the number of openings 19 provided therein.

For purposes of installing the griddle 10 in the opening provided therefor in the work surface 11 whereby the griddle 10 and the work surface 11 bear the relationship illustrated in FIG. 1 of the drawing, the griddle 10 is first lowered into the work surface opening such that the trim 15 of the griddle 10 engages the upper side of work surface 11. Thereafter, the griddle 10 may readily be secured to the work surface 11 through the use of a plurality of clamping means 16. In the particular case of griddle 10, a total of ten clamping means 16 would probably be adequate to establish a sufficiently secure connection between the griddle 10 and the work surface 11, with at least two of the clamping means 16 being employed in conjunction with each of the four stiffening angles 17, and in which event at least one such clamping means 16 would be positioned adjacent either end of each of the stiffening angles 17.

Inasmuch as the same installation procedures are followed with regard to each of the clamping means 16 irrespective of the particular number thereof being utilized in any given installation, the following is limited to a description of the manner of employment of one such clamping means 16 as illustrated in FIGS. 2 and 3 of the drawing. Thus with the trim 15 of the griddle 10 resting loosely on the upper side of work surface 11 and with each of the stiffening angles 17 suitably emplaced, leg 20b of clamping member 20 is inserted into one of the openings 19 suitably positioned in leg 17b of one of the stiffening angles 17. The free end of leg 20b of clamping member 20 is pushed through the aforesaid opening 19 until leg 20a of clamping member 20 abuts against leg 17b of stiffening angle 17 and the free end of leg 20b rests on the upper surface of outwardly projecting flange 24. Screw 23 is then threaded into the hole 22 provided therefor in leg 20b of clamping member 20 until the threaded end of screw 23 contacts the under side of leg 17a of stiffening angle 17. It is to be understood that in turn this same procedure would then be followed with respect to each of the particular clamping means 16 being employed.

For purposes of centrally positioning the griddle 10 relative to each of the four sides of the opening provided therefor in work surface 11, leg 20b of clamping member 20 of each of the clamping means 16 is now moved laterally relative to leg 17b of stiffening angle 17 such that the notch 21 in the clamping member 20 is located in juxtaposed relation to one end of the corresponding opening 19. The edge portions of notch 21 are thus capable of functioning as a stop and inasmuch as the leg 20b of each of the clamping members 20 being utilized is of the same fixed length, this procedure ensures that each of the side walls 14 of the griddle 10 will now be spaced from the leg 17b of the nearest stiffening angle 17 a distance approximately equal to the length of legs 20b of clamping members 20.

With the griddle 10 thus aligned relative to the edges of the work surface opening, screw 23 of each of the plurality of clamping means 16 being utilized is in turn rotated in a clockwise direction as viewed with reference to FIG. 2 of the drawing. This clockwise rotation of the screws 23 causes the corresponding leg 20b of the associated clamping member 20 to move away from the under side of leg 17a of stiffening angle 17, and because the free end of the aforesaid leg 20b rests upon the upper surface of one of the outwardly projecting flanges 24 affixed to the bottom wall 13 of griddle 10 along each of the four sides thereof, this results in the horizontal flange 15a of trim 15 surrounding and integral with the perimeter of the drop-in device, i.e., griddle 10, being drawn down tightly upon the upper side of work surface 11. Screws 23 are tightened to a sufficient extent to ensure that a secure connection will be maintained between griddle 10 and work surface 11. In accordance with the preferred embodiment of the invention, a suitably resilient gasket 25 previously referred to hereinabove is interposed as seen in FIG. 2 of the drawing between the outer edge of horizontal flange 15a of trim 15 and the upper side of work surface 11. The gasket 25 may be retained on the horizontal flange 15a by means of a suitable securing means such as an adhesive, etc. When the screws 23 are tightened in the aforementioned manner, resilient gasket 25 will be compressed to an extent sufficient to provide a tight seal between the trim 15 of the griddle 10 and work surface 11. It is to be understood that preferably the gasket 25 is utilized along the entire perimeter of the trim 15.

To unfasten the griddle 10 from the work surface 11, the reverse of the procedure described hereinabove is followed. That is, all of the screws 23 are unscrewed from the corresponding holes 22, the legs 20b of the clamping members 20 are moved laterally to disengage their respective notch 21 from its engagement with the end of the opening 19, and the legs 20b of clamping members 20 are then withdrawn from the openings 19. The griddle 10 is thereafter free to be lifted out of the opening provided therefor in the work surface 11.

Figure 4:
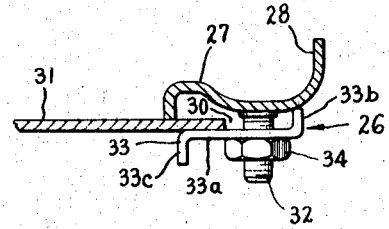
FIG. 4 is a fragmentary sectional view of another embodiment of clamping means in accordance with the present invention.

Referring now to FIG. 4 of the drawing there is illustrated therein another embodiment, in accordance with the present invention, of pull-down clamping means generally designated by reference numeral 26. The clamping means 26 is intended to be utilized with those types of drop-in cooking equipment devices which include a trim 27 integral with side walls 28 of the device, the latter side walls 28 having a portion thereof projecting upwardly awap from the opening 30 in the work surface 31 rather than downwardly into the work surface opening as in the case of the griddle 10 illustrated in FIGS. 1 and 2 of the drawing. Drop-in cooking equipment devices of the type with which clamping means 26 would be employed include among others such things as hotplates, etc., all of which are well-known both as to construction and method of operation to those skilled in this art. As such it has not been deemed necessary to further depict in the drawing or describe herein the construction of such devices, particularly inasmuch as the specific structural details thereof apart from those shown in FIG. 4 of the drawing constitute no part of the present invention.

The clamping means 26 includes a threaded stud 32 preferably welded to the under surface of trim 27 intermediate the free end of trim 27 and the upstanding portion of side wall 28 as illustrated in FIG. 4 of the drawing. Clamping means 26 further comprises a Z-shaped clamping member 33 of somewhat the same general configuration as clamping member 20 of clamping means 16, although the former is not provided with a notch corresponding to the notch 21 of clamping member 20. Furthermore, the hole (not shown) provided in the clamping member 33 to receive the stud 32 need not be threaded as in the case of hole 22 of clamping member 20 inasmuch as nut 34 is utilized for purposes of both retaining the clamping member 33 on the stud 32 and providing a means for tightening the clamping member 33 up against the under side of work surface 31 and trim 27, respectively.

As with the previously described clamping means 16, although not illustrated a plurality of clamping means 26 are preferably utilized for purposes of establishing and maintaining a secure connection between the drop-in device whose side wall 28 is depicted in FIG. 4 of the drawing and the work surface 31. Further, since each of this plurality of clamping means 26 functions in the same manner, the method of employment of only one such clamping means will be described hereinafter.

Thus, once the aforesaid drop-in device has been positioned in juxtaposed relation to the opening 30 in work surface 31 with the trim 27 of the drop-in device in engagement with the upper side of the work surface 31, the threaded studs 32 welded to the under side of trim 27 will be accessible from below the work surface 31. Some degree of alignment of the drop-in device in the opening 30 occurs by virtue of the fact that the drop-in device must be positioned relative to the opening 30 such that the studs 32 will project into the opening 30 and not rest on the upper side of work surface 31. A clamping member 33 is now placed on the stud 32 and is loosely retained thereon by means of nut 34, which is screwed onto the stud 32. The clamping member 33 is then manipulated so that the horizontally extending leg portion 33a of clamping member 33 will be adjacent the under side of work surface 31, the upstanding leg portion 33b thereof adjacent side wall 28 of the drop-in device, and the leg portion 33c thereof extending downwardly away from the under side of work surface 31. Thereafter nut 34 is tightened in order to securely clamp the work surface 31 between trim 27 and leg 33a of clamping member 33. In a similar fashion, the clamping members 33 and nuts 34 are positioned on each of the remainder of the studs 32 carried by the trim 27 and the nuts 34 are in turn tightened to securely clamp the entire perimeter of the trim 27 to the work surface 31. Leg portion 33c of clamping member 33 is provided primarily as a means of increasing the overall rigidity of clamping member 33. It is of course to be understood however that an L-shaped clamping member comprised of only leg portions 33a and 33b could also be utilized in place of Z-shaped member 33 without departing from the essence of the invention.

Although not illustrated in FIG. 4 of the drawing, it is to be understood that if desired a resilient gasket similar to the gasket 25 shown in FIG. 2 of the drawing and described hereinabove may be interposed between the under side of trim 27 and the upper side of work surface 31 whereby the resilient gasket becomes compressed when the clamping means 26 is tightened to its clamping position such as to provide a tight seal between the trim 27 and the work surface 31.

Thus, in accordance with the present invention there has been provided a pull-down clamping means for fastening a drop-in device to a work surface which obviates the installation problem associated with prior art clamping means used by industry today. Further the subject pull-down clamping means eliminates the need to drill holes in the work surface to accomplish the aforesaid fastening of the drop-in device to the work surface while yet retaining the capability of ensuring that the drop-in device is properly aligned with respect to the edge portions of the opening in the work surface provided to receive the drop-in device. The aforedescribed pull-down clamping means also facilitates the task of fastening the drop-in device to a work surface while only requiring the application of a minimal amount of manual effort, but nevertheless enabling the establishment of a secure connection to be made between the drop-in device and the work surface. Moreover, the pull-down clamping means in accordance with the present inventiton includes a minimum number of component parts, all of which are relatively simple and inexpensive to manufacture and utilize. Finally, this pull-down clamping means is extremely flexible in its employment inasmuch as it does not rely on the existence of any critical alignment of the clamping means relative to the work surface and/or drop-in device, as found in prior art forms of clamping means used for the same purpose such as for example where studs are required to be received in holes in the work surface.

While two embodiments of my invention have been illustrated and described, it will be appreciated that many modifications thereof may readily be made by those skilled in the art. I therefore intend to cover all such modifications which fall within the true spirit and scope of my invention.

What I claim as new and desire to secure by Letters Patent of the United States is:

1. A pull-down clamping means for fastening in an opening in a work surface a drop-in device having a trim projecting outwardly from an upper surface thereof and a flange portion projecting outwardly from a lower surface thereof comprising:
   (a) stiffening means supported in juxtaposed relation to said work surface substantially adjacent at least one side of said opening in said work surface, said stiffening means including a depending portion having at least one opening therein;
   (b) clamp means supported in said opening in said depending portion of said stiffening means substantially at right angles thereto, said clamp means having a first end portion projecting outwardly on one side of said opening in said depending portion and extending in substantially juxtaposed relation to said depending portion, and a longitudinally extending second end portion projecting from the other side of said opening in said depending portion into engagement with said flange portion of said drop-in device;
   (c) said clamp means further having a hole located intermediate said longitudinally extending second end portion and said other side of said opening in said depending portion; and
   (d) tightening means rotatably supported in said hole in said clamp means for movement between a clamping position wherein said tightening means bears against said stiffening means and an unclamping position wherein said tightening means is disengaged from said stiffening means, said tightening means in moving toward said clamping position causing said clamp means to move away from said work surface and said longitudinally extending second end portion to bear against said flange portion of said drop-in device to draw said trim of said drop-in device down tightly against said work surface adjacent said opening in said work surface to securely fasten said drop-in device to said work surface.

2. A pull-down clamping means as set forth in claim 1 wherein:
   (a) said stiffening means comprises a stiffening angle of substantially right-angle configuration;
   (b) said stiffening angle has a first leg positioned in juxtaposed relation to said work surface adjacent said opening in said work surface, and a second leg integral with said first leg extending at right angles thereto in spaced relation to said opening in said work surface; and
   (c) said depending portion of said stiffening means comprises said second leg of said stiffening angle.

3. A pull-down clamping means as set forth in claim 1 wherein:
   (a) said clamp means comprises a substantially L-shaped clamp member;
   (b) said first end portion limits the inward movement of said L-shaped clamp member in said opening in said depending portion of said work surface; and
   (c) said L-shaped clamp member is provided with aligning means for establishing and maintaining proper spacing between said depending portion of said stiffening angle and said drop-in device.

4. A pull-down clamping means as set forth in claim 1 wherein:
   (a) said hole in said clamp means is provided with screw threads; and
   (b) said tightening means comprises a screw having threads corresponding to said screw threads of said hole in said clamp means.

5. A pull-down clamping means for fastening in a work surface a drop-in device having a trim projecting outwardly from an upper surface thereof and a flange portion projecting outwardly from a lower surface thereof comprising:
   (a) a stiffening angle including a first leg positioned in juxtaposed relation to said work surface adjacent said opening in said work surface, and a second leg integral with said first leg extending at right angles thereto in spaced relations to said opening in said work surface, said second leg having at least one opening therein;
   (b) a substantially L-shaped clamp member supported in said opening in said second leg of said stiffening angle, said clamp member having a first end portion extending upwardly on one side of said opening in juxtaposed relation to said second leg of said stiffening angle and a longitudinally extending second end portion projecting from the other side of said opening in said second leg of said stiffening angle and resting on said flange portion of said drop-in device in frictional engagement therewith;
   (c) said L-shaped clamp member having a hole located intermediate said longitudinally extending second end portion and said other side of said opening in said second leg of said stiffening angle; and
   (d) tightening means rotatably supported in said hole in said L-shaped clamp member for movement between a clamping position wherein said tightening means bears against said first leg of said stiffening angle and an unclamping position wherein said tightening means is disengaged from said first leg of said stiffening angle, said tightening means in moving toward said clamping position causing said L-shaped clamp member to move away from said work surface and said longitudinally extending second end portion to bear against said flange portion of said drop-in device to draw said trim of said drop-in device down tightly against said work surface adjacent said opening in said work surface to securely fasten said drop-in device to said work surface.

6. A pull-down clamping means as set forth in claim 5 wherein:
   (a) said L-shaped clamp member is provided with aligning means for establishing and maintaining proper spacing between said second leg of said stiffening angle and said drop-in device;
   (b) said hole in said L-shaped clamp member is provided with screw threads, and
   (c) said tightening means comprises a screw having threads corresponding to said screw threads of said hole in said L-shaped clamp member.

References Cited

UNITED STATES PATENTS

| | | | |
|---|---|---|---|
| 2,502,553 | 4/1950 | Ball | 4—187A |
| 2,884,649 | 5/1959 | Scharmer | 4—187A |
| 2,887,103 | 5/1959 | Reeves | 126—214A |
| 3,060,454 | 10/1962 | Ament | 4—187AX |
| 3,354,474 | 11/1967 | Cairns et al. | 4—187A |

CHARLES J. MYHRE, Primary Examiner

U.S. Cl. X.R.

126—211